(12) United States Patent
Ishikawa et al.

(10) Patent No.: US 11,591,024 B2
(45) Date of Patent: Feb. 28, 2023

(54) VEHICLE SIDE BODY STRUCTURE

(71) Applicant: Mazda Motor Corporation, Hiroshima (JP)

(72) Inventors: Yasushi Ishikawa, Hiroshima (JP); Yuichi Morita, Hiroshima (JP); Ken Fujimoto, Hiroshima (JP); Yusaku Yamaguchi, Hiroshima (JP); Matsubara Hiroshi, Hiroshima (JP); Miyoshi Katsuhisa, Hiroshima (JP); Yokogi Yuji, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 3 days.

(21) Appl. No.: 17/377,414

(22) Filed: Jul. 16, 2021

(65) Prior Publication Data

US 2022/0041220 A1 Feb. 10, 2022

(30) Foreign Application Priority Data

Aug. 6, 2020 (JP) .............................. JP2020-133810

(51) Int. Cl.
| | |
|---|---|
| *B62D 21/15* | (2006.01) |
| *B62D 25/04* | (2006.01) |
| *B60R 21/232* | (2011.01) |
| *B62D 25/02* | (2006.01) |

(52) U.S. Cl.
CPC .......... *B62D 21/152* (2013.01); *B60R 21/232* (2013.01); *B62D 21/157* (2013.01); *B62D 25/02* (2013.01); *B62D 25/04* (2013.01); *B62D 25/025* (2013.01)

(58) Field of Classification Search
CPC ....... B62D 25/04; B62D 25/02; B62D 21/152
USPC ........ 296/193.06, 203.01, 2, 193.05, 193.09, 296/187.09, 187.1
See application file for complete search history.

(56) References Cited

U.S. PATENT DOCUMENTS 9,815,498 B2 * 11/2017 Yamamoto ........... B62D 29/002
10,618,561 B2 * 4/2020 Tomiki ................... B62D 27/02

FOREIGN PATENT DOCUMENTS

| | | | |
|---|---|---|---|
| EP | 1419940 A1 | * | 5/2004 |
| JP | 2019-172087 A | | 10/2019 |

* cited by examiner

*Primary Examiner* — Dennis H Pedder
(74) *Attorney, Agent, or Firm* — Xsensus LLP

(57) ABSTRACT

A side body structure of a vehicle can include: a hinge pillar; a front pillar that is coupled to an upper end portion of this hinge pillar via a bent section, extends upward to the rear, and is coupled to a front end portion of a roof side rail via a connected section; and an apron rein that extends forward from a position below the bent section in the hinge pillar, where the bent section can include an energy absorption section that is subjected to out-of-plane deformation in a longitudinal orthogonal direction of the front pillar and thereby can absorb collision energy when the collision energy, which can be directed rearward, is applied to the apron rein. The energy absorption section can be configured to include an outer bead section and an inner bead section respectively provided in an outer member and a lower inner member.

15 Claims, 7 Drawing Sheets

VEHICLE SIDE BODY STRUCTURE

CROSS-REFERENCE TO RELATED APPLICATION

The present application claims priority to Japanese App. No. 2020-133810 filed Aug. 6, 2020, the entire content and disclosure of which is incorporated by reference herein in its entirety.

TECHNICAL FIELD

Embodiments of the present disclosure can relate to a vehicle side body structure that can include: a front pillar that extends upward to a rear side in a vehicle body from a hinge pillar via a bent section; and an apron reinforcement that extends forward from a position below the bent section of the hinge pillar.

BACKGROUND ART

Prior Art Documents

Patent Documents

[Patent document 1] JP-A-2019-172087

SUMMARY

According to one or more aspects, a vehicle side body structure is disclosed or provided. The vehicle side body structure can comprise: a hinge pillar that extends in an up-down direction; a front pillar that is coupled to an upper end portion of the hinge pillar via a bent section, that extends upward to a rear side in a vehicle body, and that is coupled to a front end portion of a roof side rail via a connected section; and an apron reinforcement that extends forward from a position below the bent section in the hinge pillar. The bent section can include an energy absorption section configured to be subjected to out-of-plane deformation in a longitudinal orthogonal direction of the front pillar and thereby absorb collision energy in a case where the collision energy, which is directed rearward, is applied to the apron reinforcement.

DETAILED DESCRIPTION

Figure 1:
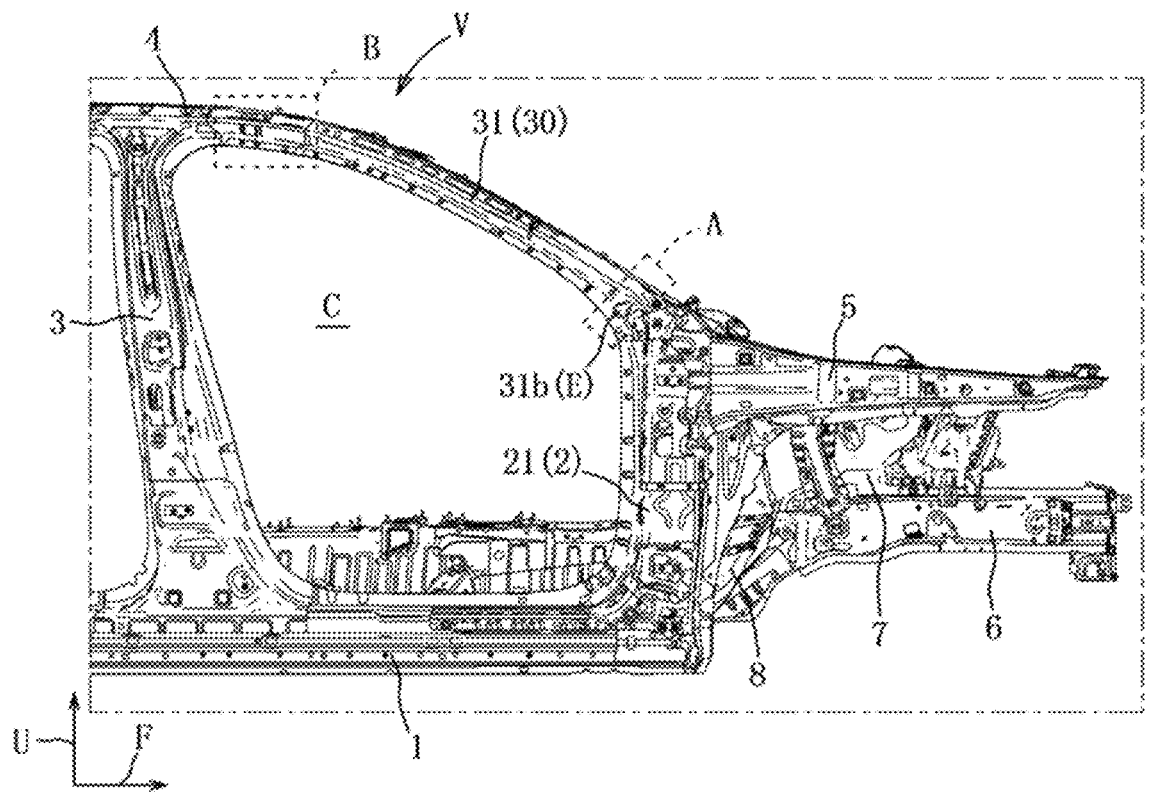
FIG. 1 is a side view of a vehicle, which is seen from an outer side in a vehicle width direction, according to a first embodiment of the present disclosure.

A detailed description will hereinafter be made on an embodiment of the present invention with reference to the drawings.

The following description will exemplify application of the present invention to a vehicle side body structure and thus has no intention to limit the present invention, application subjects thereof, and application thereof.

Conventionally, during a so-called small overlap collision in which an obstacle collides with a portion (e.g., 25% or less of an overlapping area) on an outer side in a vehicle width direction from a front side frame, a collision load can concentrate on an attachment section (base end section) of an apron reinforcement (hereinafter abbreviated as an apron rein), and a hinge pillar can be locally buckled to the rear. A representative example of the small overlap collision is a small overlap rigid barrier (SORB) test. In the case where the hinge pillar is locally buckled, rotational displacement of the hinge pillar can occur in a state where a crossing angle between the hinge pillar and a front pillar is maintained. As a result, a connection portion between the front pillar and a roof side rail can bulge upward, which may eventually cause bending deformation or a rupture of the connection portion and deformation of a cabin shape.

For example, a vehicle front pillar reinforcing structure described in the above-mentioned Patent document 1 may have: a front pillar that may form a closed cross section with an outer panel and an inner panel; and a reinforcement that may be disposed in the closed cross section and reinforce the front pillar. The reinforcement may include a bottom wall portion along a lower wall portion of the outer panel, and plural ridgelines, each of which may extend along an axial direction of the front pillar, may be formed on both ends of this bottom wall portion. In a front pillar lower portion, to which compressive stress may be applied, buckling thereof caused by compression may be prevented with a ridgeline structure. In a front pillar upper portion, to which tensile stress may be applied, bending deformation thereof may be avoided by intentionally omitting the ridgeline structure.

Recently, in addition to an airbag system that protects an occupant against a frontal impact load, a curtain airbag system that protects the occupant against a lateral collision load can be mounted on a vehicle.

In general, a curtain airbag system may include: an airbag that can be inflated and expanded on a lateral side of the occupant; an inflator that supplies inflation gas to this airbag; a retainer that fixes the airbag and the inflator; and an airbag cover that covers the airbag prior to inflation and expansion. The retainer can be fixed to an inner surface in the vehicle width direction of an inner front pillar, and a surface of the entire system can be covered with a front pillar trim.

In the case where the bending deformation occurs to the connected portion between the front pillar and the roof side rail and the connection portion thereby bulges upward during the small overlap collision, the front pillar position may be displaced due to the deformation of the cabin. As a result, a position where the curtain airbag is expanded may be shifted from an intended position.

As in the vehicle front pillar reinforcing structure of the above-mentioned Patent document 1, by adding the reinforcement that is formed with the plural ridgelines in the closed cross section of the front pillar, rigidity of the front pillar as a whole can be increased, and the displacement of the front pillar position can be prevented.

However, the addition of the reinforcement can create new problems of a vehicle body weight increase and lowered fuel economy associated with this weight increase.

That is, it may not be easy to prevent the displacement of the front pillar position during the small overlap collision while avoiding the vehicle body weight increase.

One or more embodiments of the present disclosure can have a purpose, of multiple purposes, of providing a vehicle side body structure and the like capable of minimizing or preventing displacement of a front pillar position during a small overlap collision while avoiding a vehicle body weight increase.

The vehicle side body structure according to one or more embodiments of the present disclosure can be a vehicle side body structure that can include: a hinge pillar that can extend in an up-down direction; a front pillar that can be coupled to an upper end portion of this hinge pillar via a bent section, can extend upward to a rear side in a vehicle body, and can be coupled to a front end portion of a roof side rail via a connected section; and an apron reinforcement that can extend forward from a position below the bent section in the hinge pillar. In the vehicle side body structure, the bent section can include an energy absorption section that may be subjected to out-of-plane deformation in a longitudinal orthogonal direction of the front pillar and thereby can absorb collision energy when the collision energy, which can be directed rearward, is applied to the apron reinforcement.

In vehicle side body structures according to embodiments of the disclosed subject matter, the bent section can include the energy absorption section that may be subjected to the out-of-plane deformation in the longitudinal orthogonal direction of the front pillar and thereby can absorb the collision energy when the collision energy, which may be directed rearward, is applied to the apron reinforcement. Therefore, it can be possible to reduce a collision load that may be transmitted to a portion behind the bent section by absorbing the collision load with the energy absorption section, and to minimize or prevent displacement of the front pillar position by avoiding bending deformation that occurs to the connected section between the front pillar and the roof side rail.

According to one or more embodiments, the front pillar can include: an outer member; and an inner member that cooperates with the outer member to form a closed cross section shifted upward to the rear, and the energy absorption section can include a bead section provided in the outer member and/or the inner member. With such a configuration, the out-of-plane deformation can occur in the longitudinal orthogonal direction of the front pillar by using the bead section as the energy absorption section without preparing a newly provided member, it can be possible to reduce the collision load that may be transmitted to the portion behind the bent section.

According to one or more embodiments, each of the outer member and the inner member can have a flange in an outer edge portion, and the flange can be formed with a notched section at a position near the bead section. With such a configuration, it can be possible to induce cross-sectional deformation by the bead section of the front pillar.

According to one or more embodiments, in each of the outer member and the inner member, the flange can be joined by plural joint sections, and a distance between the joint sections that are adjacent to the bead section can be longer than a distance between the joint sections that are away from the bead section.

With such a configuration, it can be possible to promote the cross-sectional deformation by the bead section of the front pillar.

According to one or more embodiments, the energy absorption section can have an outer bead section provided in the outer member and an inner bead section provided in the inner member, where the outer bead section and the inner bead section can be located at the substantially same position in a front-rear direction in a side view. With such a configuration, it can be possible to efficiently avoid bending deformation, which may occur to the connected section between the front pillar and the roof side rail, by a synergic effect of the outer bead section and the inner bead section.

According to one or more embodiments, the outer bead section can be formed to be projected from the closed cross section, and the inner bead section can be formed to be recessed from the closed cross section. With such a configuration, the cross-sectional deformation of the outer bead section and the cross-sectional deformation of the inner bead section can each have directivity. As a result, it can be possible to further efficiently induce the cross-sectional deformation of the front pillar.

According to one or more embodiments, a curtain airbag system can include an airbag in the form of a curtain, and the airbag in the form of the curtain can be inflated and expanded by gas pressure that can be supplied when a specified condition is established. The curtain airbag system can be installed in an inner portion in a vehicle width direction of the inner member. With such a configuration, it can be possible to prevent displacement of the front pillar position during a small overlap collision and thus to expand the airbag at an intended position.

According to one or more embodiments of the present disclosure, the bent section, which can be located between the hinge pillar and the front pillar, can be provided with the energy absorption section that may be subjected to the out-of-plane deformation and can thereby absorb the energy. In this way, it can be possible to minimize or prevent the displacement of the front pillar position during the small overlap collision while avoiding a body weight increase.

First Embodiment

A description will hereinafter be made on a first embodiment of the present disclosure with reference to FIG. 1 to FIG. 14.

Figure 2:
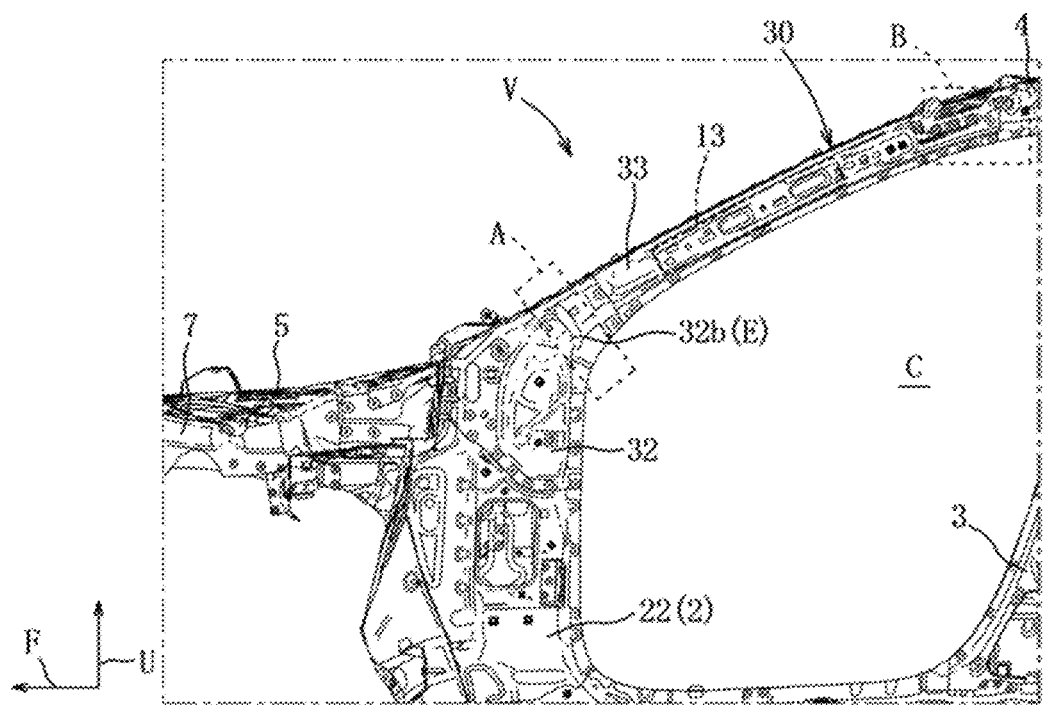
FIG. 2 is a side view of the vehicle, which is seen from an inner side in the vehicle width direction, according to the first embodiment.

As illustrated in FIG. 1 and FIG. 2, a vehicle V can include: a right and left pair of side sills 1, each of which can extend in a front-rear direction; a right and left pair of hinge pillars 2, each of which can extend vertically upward from a front end portion of respective one of the paired side sills 1; a right and left pair of center pillars 3, each of which can extend vertically upward from an intermediate portion of respective one of the paired side sills 1; a right and left pair of roof side rails 4, each of which can extend in the front-rear direction in respective one of end portions in a vehicle width direction of a roof panel; a front pillar 30 that can be coupled to an upper end portion of the hinge pillar 2 via a bent section A, can extend upward to the rear, and can be coupled to a front end portion of the roof side rail 4 via a connected section B; an apron reinforcement (hereinafter abbreviated as an apron rein) 5 that can extend forward from a position below the bent section A of the hinge pillar 2; and the like.

This vehicle V can be provided with an energy absorption section E that may be subjected to out-of-plane deformation in a longitudinal orthogonal direction of the front pillar 30 and can thereby absorb collision energy when the collision energy, which may be directed rearward, is applied to the apron rein 5 during a so-called small overlap collision. In the small overlap collision, an obstacle collides with a portion (e.g., 25% or less of an overlapping area) on an outer side in the vehicle width direction from a front side frame 6, and a representative example of the small overlap collision is a small overlap rigid barrier (SORB) test. In this embodiment, the energy absorption section E can include an outer bead section 31b and an inner bead section 32b, which will be described below.

Here, the out-of-plane deformation that may occur in the longitudinal orthogonal direction of the front pillar 30 does not mean overall buckling as a skeleton frame, but can be defined as local buckling or partial deformation of a portion (for example, a particular portion such as a flange) constituting a member cross section.

First, a description will be made on a schematic configuration of the vehicle V.

As illustrated in FIG. 1 and FIG. 2, an opening C, which can be opened/closed by a front door and from which a front-seat occupant can get in/out, can be provided to each of right and left portions of the vehicle V.

The opening C, which may be in a substantially trapezoidal shape, can be formed by a front-half portion of the side sill 1, the hinge pillar 2, the center pillar 3, a front portion of the roof side rail 4, the front pillar 30, and the like, for instance.

Since the vehicle V can have a bilaterally-symmetrical structure, the following description will mainly be made on the right portion thereof. In addition, in the drawings, an arrow F direction is set as forward in a body front-rear direction, an arrow OUT direction is set as outward in the vehicle width direction, and an arrow U direction is set as upward in a body up-down direction.

As illustrated in FIG. 1, the right and left pair of the front side frames 6, each of which can extend forward from a dashboard, can be arranged between the paired side sills 1. A suspension tower 7 that can support a damper in a front-wheel suspension can be formed between the front side frame 6 and the apron rein 5.

The suspension tower 7 can include a wheel house 8, which can accommodate a front wheel and the front-wheel suspension, in an integrated manner. The wheel house 8 can be formed in an area in front of the dashboard and below the apron rein 5.

Next, a description will be made on the hinge pillar 2.

As illustrated in FIG. 1 to FIG. 5, for instance, the hinge pillar 2 can have: an outer member 21 that can have a substantially hat-shaped cross section; and a plate-shaped inner member 22 that can cooperate with the outer member 21 to form a closed cross section that can extend upward and have a substantially rectangular shape. Each of the outer member 21 and the inner member 22 can be formed from high tensile steel or ultra-high tensile steel.

The outer member 21 can include: a body section that may have a substantially U-shaped cross section; and a front and rear pair of flanges that may extend forward and rearward from a front end portion and a rear end portion of this body section. An upper stage portion and a lower stage portion of the body section can be formed with an up and down pair of hinge attachment sections bulging outward in the vehicle width direction. Door hinges of the front door can be attached to the hinge attachment sections. The bent section A can be formed in a coupled portion between the hinge pillar 2 and the front pillar 30, and the front pillar 30 can extend upward to the rear via the bent section A.

Figure 3:
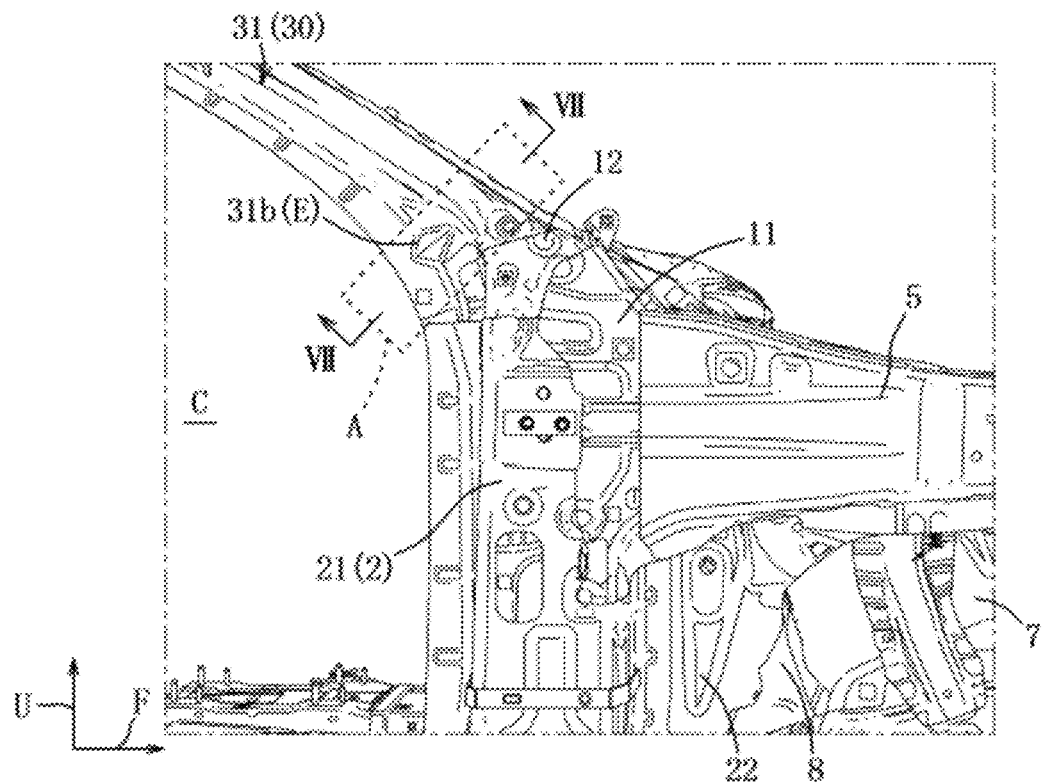
FIG. 3 is an enlarged view of a main section in FIG. 1.

As illustrated in FIG. 3, a cowl side rein 11 and a front pillar rein 12 can be joined to an upper end portion of the outer member 21, which can correspond to a position near a lower side of the bent section A.

The bent section A can be provided in an area that can correspond to a lower end portion of the front pillar 30.

The cowl side rein 11 can be joined to the outer member 21, for instance, by spot welding in a manner to partially overlap a right end portion of the upper hinge attachment section.

An outer surface portion of the apron rein 5 can be coupled to the outer member 21 via the cowl side rein 11. The front pillar rein 12 can be joined to a rear portion of an upper end of the cowl side rein 11, an upper end of a rear portion of the outer member 21, and a lower end portion of an outer member 31 of the front pillar 30. An inner surface portion of the apron rein 5 can be coupled to the inner member 22.

Figure 4:
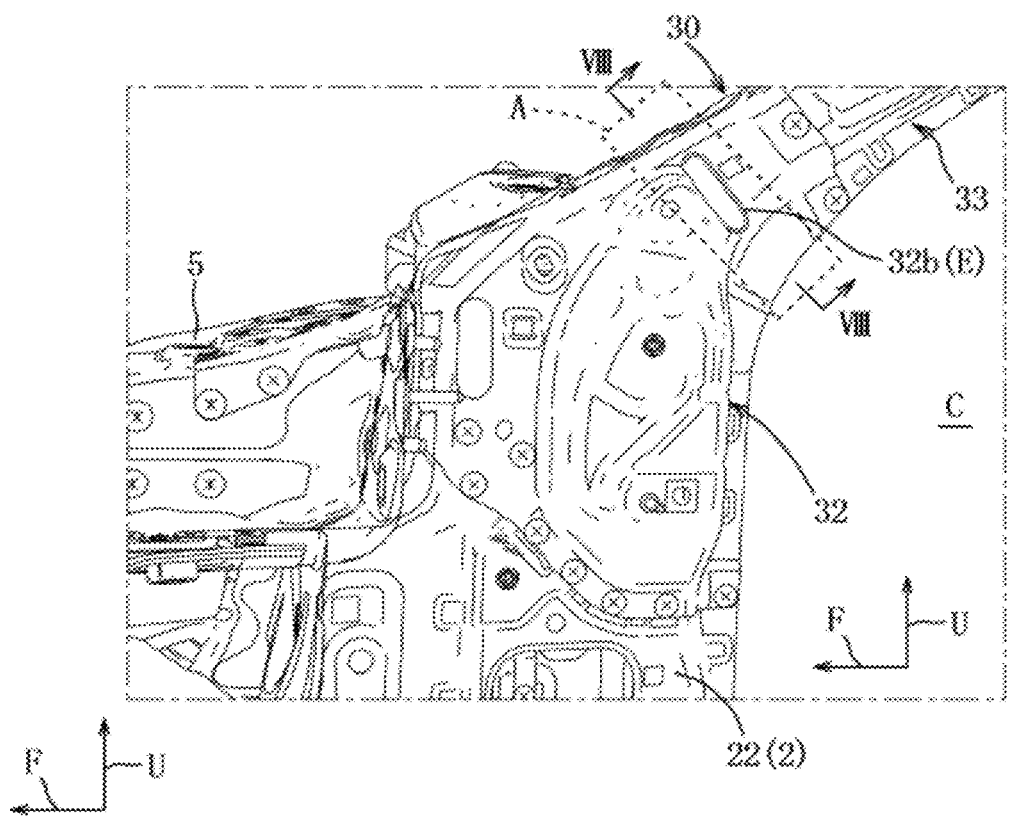
FIG. 4 is an enlarged view of a main section in FIG. 2.
Figure 6:
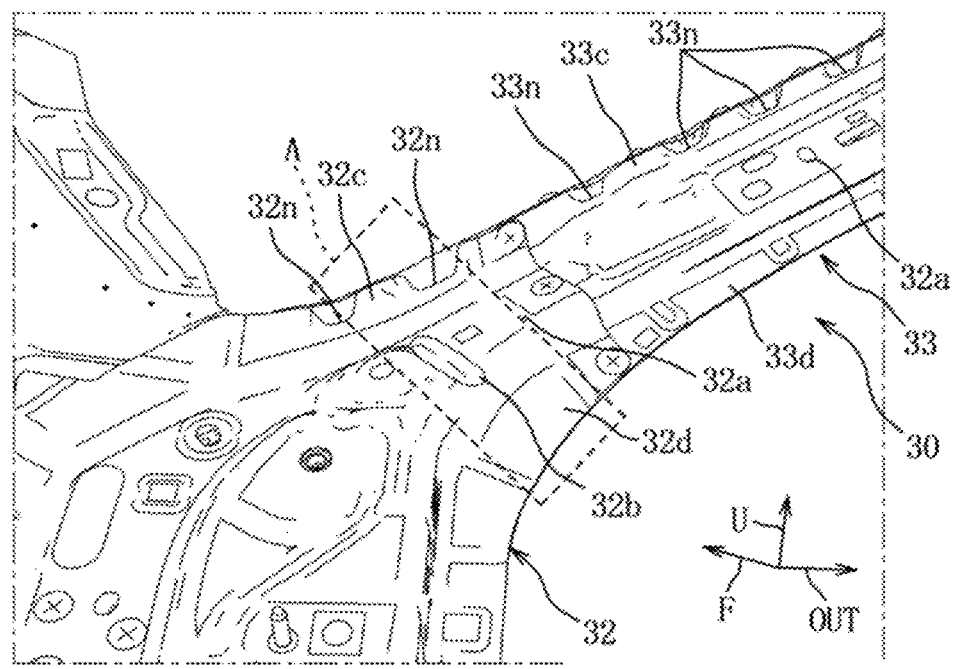
FIG. 6 is a view of the bent section seen from the inner side in the vehicle width direction.

As illustrated in FIG. 2, FIG. 4, and FIG. 6, a lower inner member 32 of the front pillar 30 can be joined to an upper end portion of the inner member 22 at the position near the lower side of the bent section A.

Next, a description will be made on the front pillar 30.

As illustrated in FIG. 1 and FIG. 2, for instance, the front pillar 30 can be provided in a substantially linear shape between the bent section A, which can be formed in an upper portion of the hinge pillar 2, and the connected section B, which can be formed in the front portion of the roof side rail 4. The front pillar 30 can be formed to be shifted upward to the rear.

As illustrated in FIG. 1 to FIG. 8, the front pillar 30 can include: the outer member 31; an inner member that can cooperate with the outer member 31 to form a closed cross section in a substantially oval shape, more specifically, a portion (an upper portion) of the lower inner member 32 and an upper inner member 33; and the like.

Figure 5:
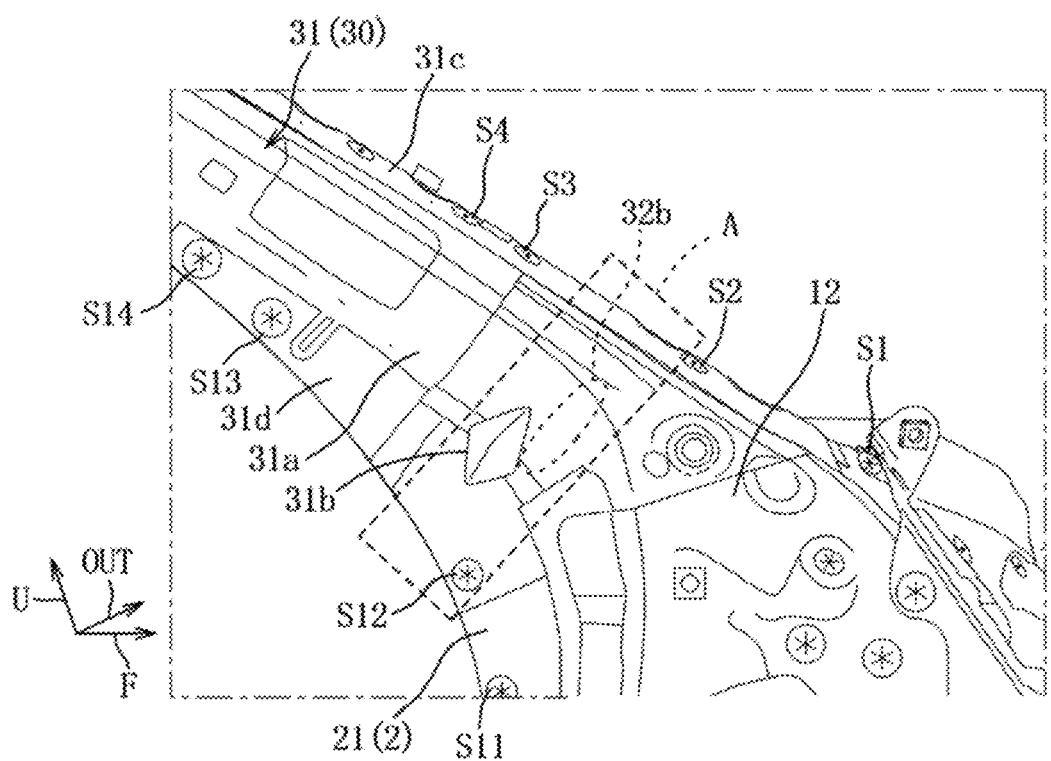
FIG. 5 is a view of a bent section seen from the outer side in the vehicle width direction.
Figure 7:
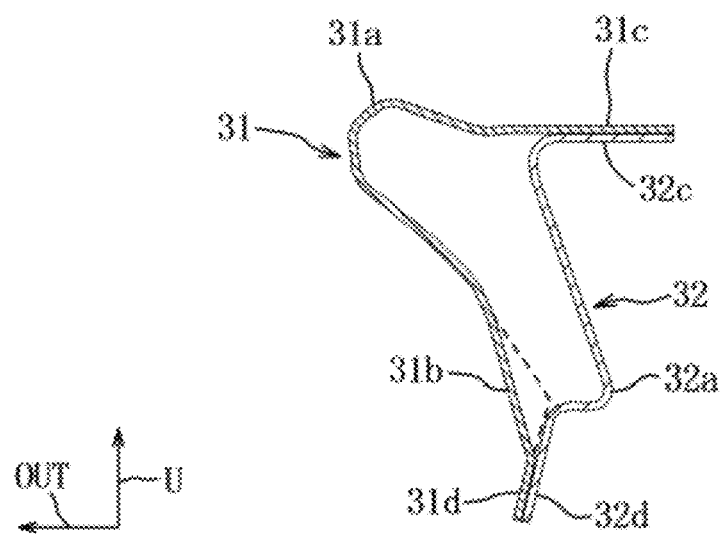
FIG. 7 is a cross-sectional view taken along line VII-VII in FIG. 3.

As illustrated in FIG. 3, FIG. 5, and FIG. 7, the outer member 31 can have: a body section 31a having a substantially U-shaped cross section; the single outer bead section 31b; an upper flange 31c that can extend inward in the vehicle width direction from an upper end portion of the body section 31a; and a lower flange 31d that can extend downward from a lower end portion of the body section 31a. The body section 31a can be formed to bulge upward to the outer side in the vehicle width direction.

The outer bead section 31b, which can serve as the energy absorption section E, can be formed in an area from a lower-half portion of the body section 31a to an upper-half portion of the lower flange 31d and can have, for instance, a substantially rhombic shape in a front view. The outer bead section 31b can include a ridgeline that extends in the up-down direction, and can be formed to be projected from the closed cross section in the oval shape.

Figure 8:
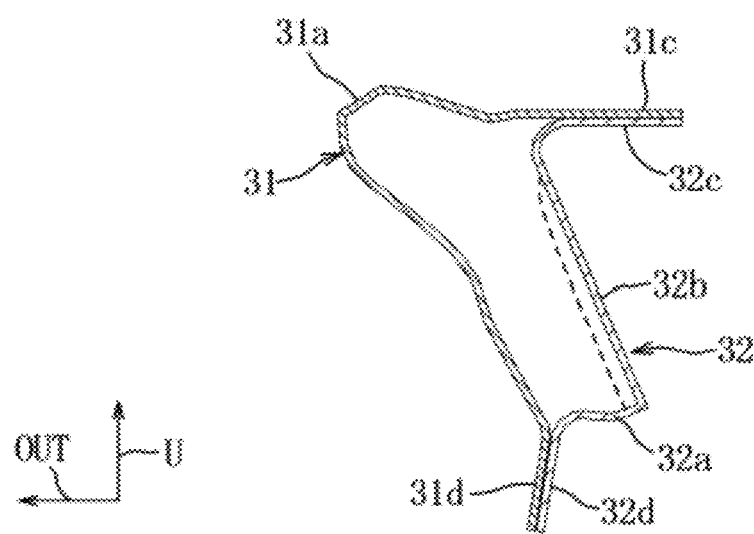
FIG. 8 is a cross-sectional view taken along line VIII-VIII in FIG. 4.

As illustrated in FIG. 4, FIG. 6, and FIG. 8, the lower inner member 32 can be formed by pressing a panel member. The lower inner member 32 can include: a vertical portion that can be joined to an upper end portion of the inner member 22; and a rearward inclined portion that can be joined to a lower end portion of the upper inner member 33.

The vertical portion of the lower inner member 32 can constitute a part of the inner member 22 of the hinge pillar 2, and the rearward inclined portion can constitute a part of the inner member of the front pillar 30.

The rearward inclined portion of the lower inner member 32 can include: a body section 32a that may have a substantially U-shaped cross section; the single inner bead section 32b; an upper flange 32c that may extend inward in the vehicle width direction from an upper end portion of the body section 32a; a lower flange 32d that may extend downward from a lower end portion of the body section 32a; plural notched sections 32n; and the like. The body section 32a can be formed to bulge downward to the inner side in the vehicle width direction. The inner bead section 32b, which may serve as the energy absorption section E, can be formed in a linear shape in a front view and an inclined shape, which can be shifted downward to the rear, with respect to the body section 32a. From a position near the lower end portion of the body section 32a to a position near an upper end portion thereof, the inner bead section 32b can be formed to be recessed from the closed cross section, for instance, in the oval shape.

As illustrated in FIG. 5, the inner bead section 32b can be disposed at the substantially same height position and the substantially same position in the front-rear direction with respect to the outer bead section 31b in a side view. More specifically, the inner bead section 32b can be arranged at a position near and on a front side of the outer bead section 31b.

In plural joint sections S1 to S4 and the like, for example, the upper flange 32c and an upper flange 33c, which will be described below, can be joined to the upper flange 31c, for instance, by spot welding.

In plural joint sections S11 to S14 and the like, for example, the lower flange 32d and a lower flange 33d, which will be described below, can be joined to the lower flange 31d, for instance, by spot welding.

On an upper side of the outer bead section 31b and the inner bead section 32b and in a longitudinal direction of the front pillar 30, a pitch distance between the joint sections S2, S3, between which the outer bead section 31b and the inner bead section 32b can be interposed, can be set to be longer than a pitch distance between other welded portions, for example, a pitch distance between the joint sections S1, S2 and a pitch distance between the joint sections S3, S4.

On a lower side of the outer bead section 31b and the inner bead section 32b and in the longitudinal direction of the front pillar 30, a pitch distance between the joint sections S12, S13, between which the outer bead section 31b and the inner bead section 32b can be interposed, can be set to be longer than a pitch distance between other welded portions, for example, a pitch distance between the joint sections S11, S12 and a pitch distance between the joint sections S13, S14.

As illustrated in FIG. 6, for instance, the plural notched sections 32n can be formed in the rearward inclined portion of the lower inner member 32. More specifically, the notched sections 32n, each of which can have a substantially trapezoidal shape, can be provided in the upper flange 32c. Of the plural notched sections 32n, the specified notched section 32n (for example, the second one from the front) can be formed at a position corresponding to a forward extended line from the inner bead section 32b.

As illustrated in FIG. 6, for instance, the upper inner member 33 can include: a body section 33a that may have a substantially U-shaped cross section; the upper flange 33c that can extend inward in the vehicle width direction from an upper end portion of the body section 33a; the lower flange 33d that can extend downward from a lower end portion of the body section 33a; plural notched sections 33n; and the like.

The upper inner member 33 can be formed to continue from a cross-sectional shape of the rearward inclined portion of the lower inner member 32. The plural notched sections 33n each can be formed in the substantially trapezoidal shape in a similar manner to the notched sections 32n, and can be provided in the upper flange 33c.

As illustrated in FIG. 2, a curtain airbag system 13 can be installed on an inner surface in the vehicle width direction of the upper inner member 33, and the curtain airbag system 13 can protect the occupant against a collision load from a lateral side.

The curtain airbag system 13 can include: a curtain-like airbag that can be inflated and expanded on a lateral side of the occupant; an inflator that can supply inflation gas to the airbag when a specified condition is established; a retainer that can fix the airbag and the inflator; and an airbag cover that can cover the airbag prior to inflation and expansion, and a surface of the curtain airbag system 13 can be covered with a front pillar trim.

Next, a description will be made on operational effects of the side body structure of the vehicle V according to one or more embodiments of the present disclosure.

Prior to the description of the operational effects, a description will be made on a verification result of the SORB test using the vehicle V.

Figure 9:
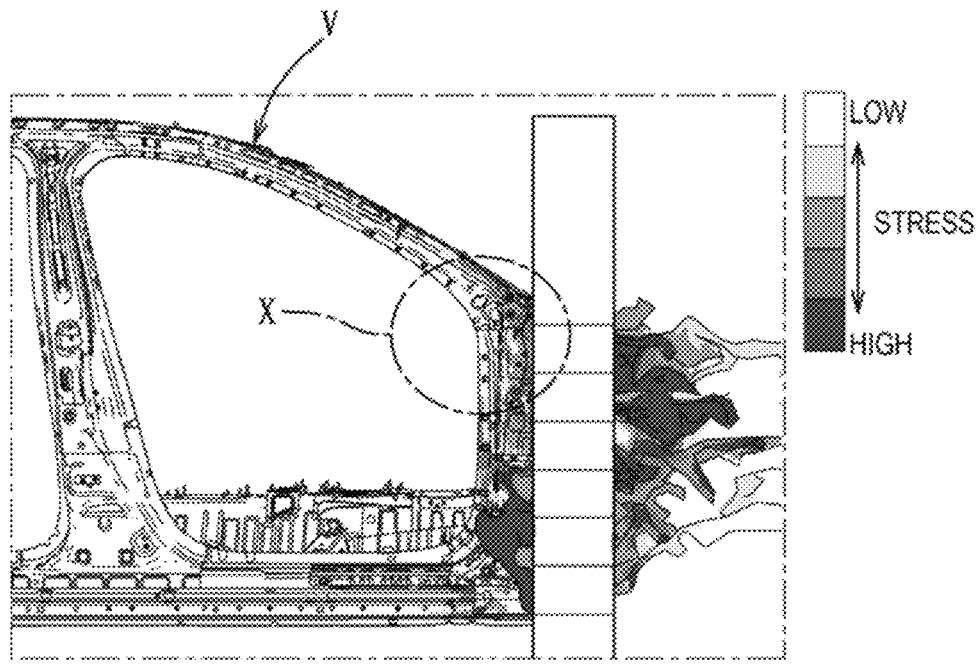
FIG. 9 is an explanatory view of a verification result.
Figure 10:
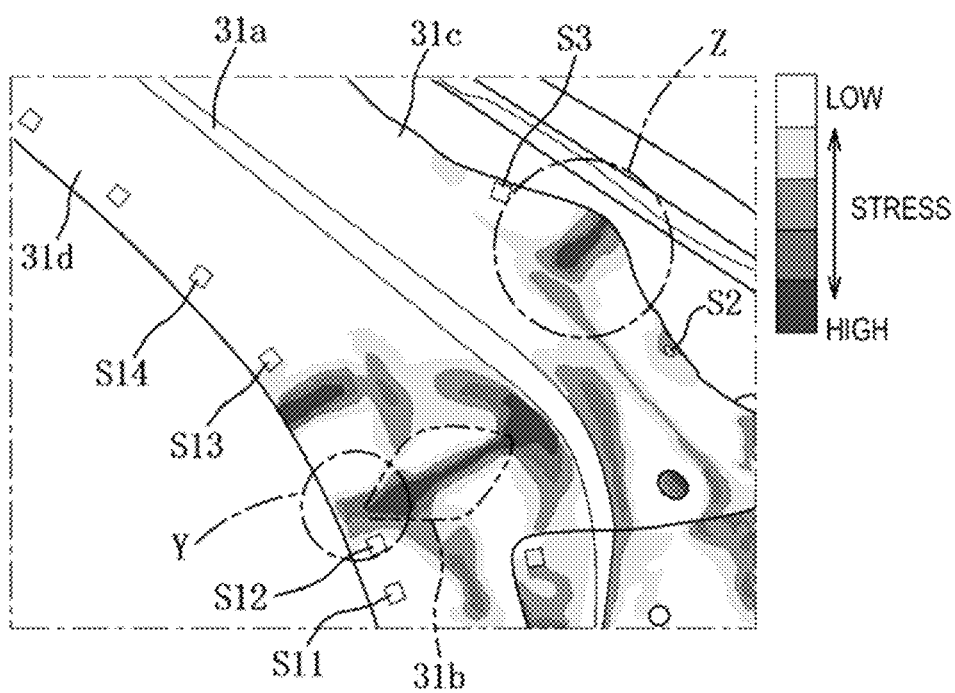
FIG. 10 is an enlarged view of an area X in FIG. 9.
Figure 11:
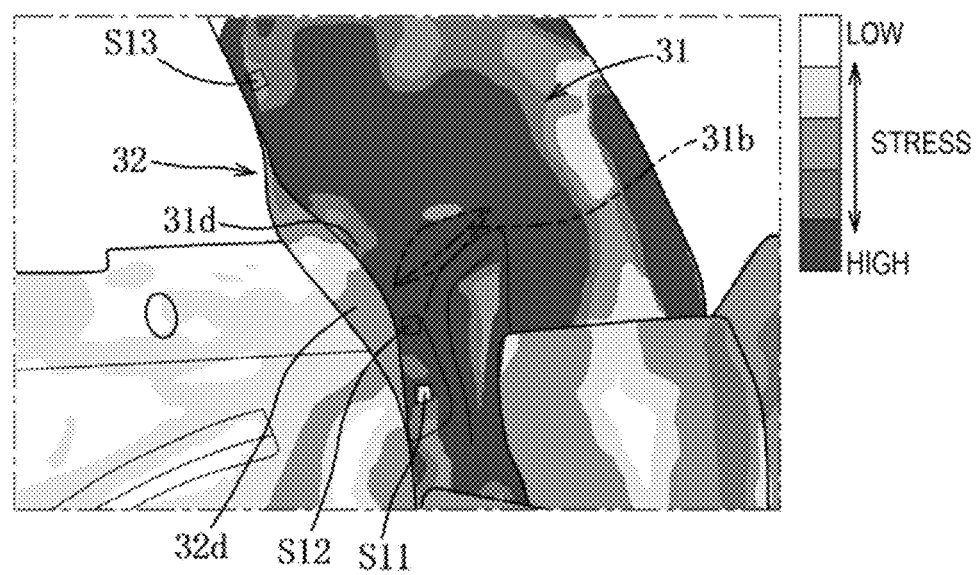
FIG. 11 is an enlarged perspective view of an area Y in FIG. 10.
Figure 12:
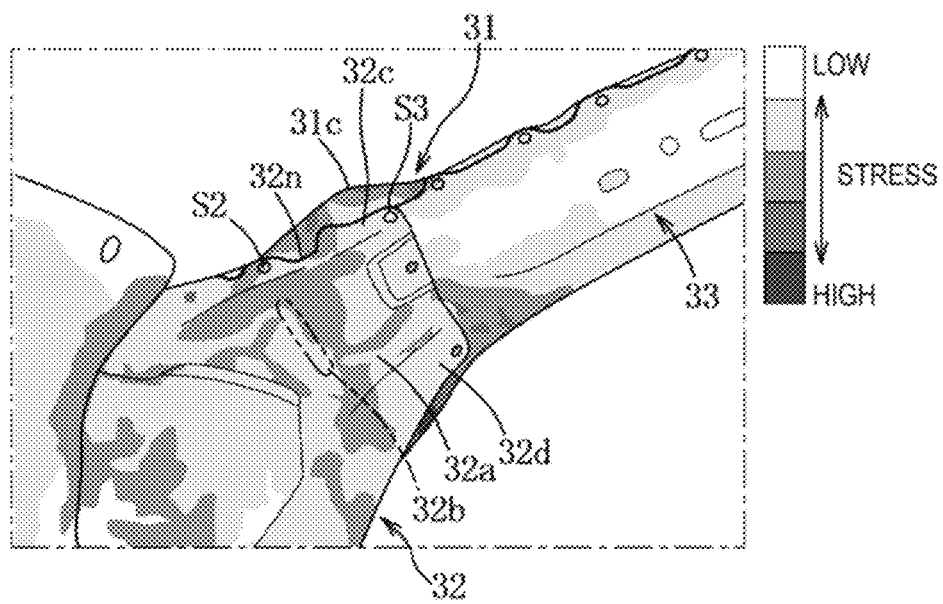
FIG. 12 is a view of an area Z in FIG. 10 seen from the inner side in the vehicle width direction.

Here, FIG. 9 is a side view illustrating overall deformation behavior immediately after the small overlap collision between the vehicle V and a barrier, FIG. 10 is an enlarged view of an area X, FIG. 11 is an enlarged perspective view of an area Y, and FIG. 12 is a view in which an area Z is seen from the inner side in the vehicle width direction.

As illustrated in FIG. 10 and FIG. 11, for instance, immediately after the small overlap collision occurs, the collision load can be concentrated on a shape line portion of the outer bead section 31b in the outer member 31.

Figure 13:
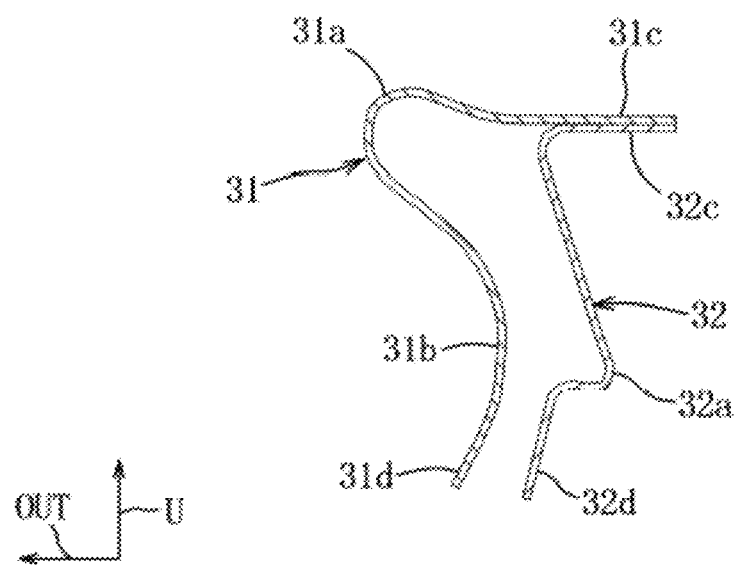
FIG. 13 is a view illustrating deformation behavior of an outer member.

As illustrated in FIG. 13, since the pitch distance between the joint sections S12, S13 can be set to be longer than the pitch distances at the other positions and the outer bead section 31b can be formed to be projected, the lower flange 31d can be deformed to be opened by the concentrated collision load. In addition, instead of buckling of the entire outer bead section 31b, the out-of-plane deformation of the outer bead section 31b can occur in the longitudinal orthogonal direction of the front pillar 30.

As illustrated in FIG. 10 and FIG. 12, immediately after the small overlap collision occurs, the collision load can be concentrated on a shape line portion of the inner bead section 32b in the lower inner member 32.

Figure 14:
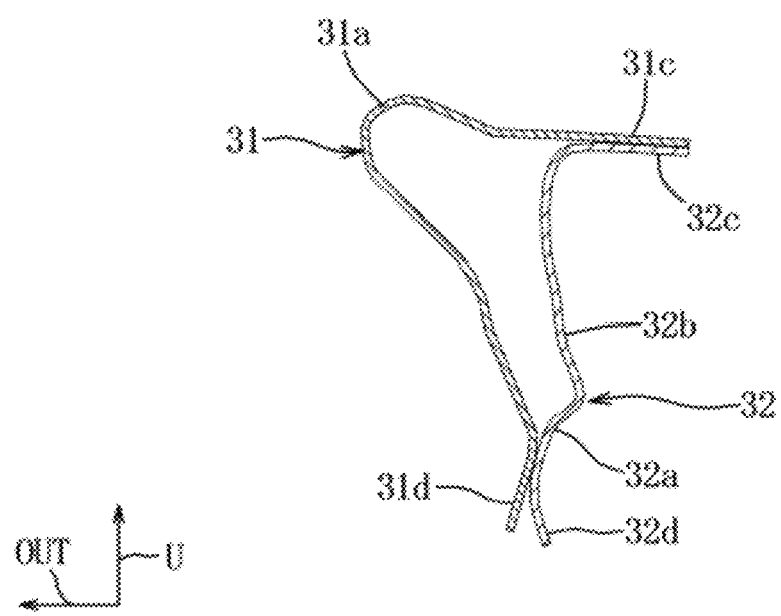
FIG. 14 is a view illustrating deformation behavior of an inner member.

As illustrated in FIG. 14, since the pitch distance between the joint sections S2, S3 can be set to be longer than the pitch distances at the other positions and the inner bead section 32b can be formed to be recessed, the lower flange 32d can be deformed to be closed by the concentrated collision load. In addition, as illustrated in FIG. 12, the notched section 32n can be formed at the position corresponding to the forward extended line from the inner bead section 32b. Thus, the upper flange 32c can be deformed to be opened, and, instead of buckling of the entire inner bead section 32b, the out-of-plane deformation of the inner bead section 32b can occur in the longitudinal orthogonal direction of the front pillar 30.

With such a configuration, the bent section A can include the energy absorption section E (the outer bead section 31b and the inner bead section 32b) that can be subjected to the out-of-plane deformation in the longitudinal orthogonal direction of the front pillar 30 and thereby can absorb the collision energy when the collision energy, which can be directed rearward, is applied to the apron rein 5. Therefore, it can be possible to reduce the collision load, which can be transmitted to a portion behind the bent section A, by absorbing the collision load with the energy absorption section E, and to minimize or prevent displacement of the position of the front pillar 30 by avoiding bending deformation that can occur to the connected section B between the front pillar 30 and the roof side rail 4.

The front pillar 30 can include: the outer member 31; and the lower inner member 32 and the upper inner member 33 that can cooperate with this outer member 31 to form the closed cross section shifted upward to the rear. The energy absorption section E can include the outer bead section 31*b* and the inner bead section 32*b* that can be provided in the outer member 31 and the lower inner member 32, respectively. In this way, the out-of-plane deformation can occur in the longitudinal orthogonal direction of the front pillar 30 by using the outer bead section 31*b* and the inner bead section 32*b* as the energy absorption section E without preparing a newly provided member.

The outer member 31 and the lower inner member 32 respectively can have the flanges 31*c*, 31*d* and the flanges 32*c*, 32*d* in outer edge portions. The upper flange 32*c* can be formed with the notched sections 32*n* at the positions near the inner bead section 32*b*. In this way, it can be possible to easily induce cross-sectional deformation by the inner bead section 32*b* of the front pillar 30.

The outer member 31 and the lower inner member 32 can be formed such that the flanges 31*c*, 31*d* and 32*c*, 32*d* can be joined by the plural joint sections S1 to S4, S11 to S14 and that the distance between the joint sections S2, S3, which can be adjacent to the outer bead section 31*b*, and the distance between the joint sections S12, S13, which can be adjacent to the inner bead section 32*b*, can be set to be longer than the distances between the other joint sections away from the outer bead section 31*b* and the inner bead section 32*b*. In this way, it can be possible to promote the cross-sectional deformation by the outer bead section 31*b* and the inner bead section 32*b* of the front pillar 30.

The energy absorption section E can have: the outer bead section 31*b* that can be provided in the outer member 31; and the inner bead section 32*b* that can be provided in the lower inner member 32. The outer bead section 31*b* and the inner bead section 32*b* can be located at the substantially same position in the front-rear direction in the side view. Therefore, it can be possible to efficiently avoid the bending deformation, which can occur to the connected section B between the front pillar 30 and the roof side rail 4, by a synergic effect of the outer bead section 31*b* and the inner bead section 32*b*.

The outer bead section 31*b* can be formed to be projected from the closed cross section, and the inner bead section 32*b* can be formed to be recessed from the closed cross section. Thus, the cross-sectional deformation by the outer bead section 31*b* and the inner bead section 32*b* can have directivity. Therefore, it can be possible to further efficiently induce the cross-sectional deformation of the front pillar 30.

The curtain airbag system 13 can be provided and can include the curtain-like airbag that can be inflated and expanded by gas pressure that can be supplied when the specified condition is established. The curtain airbag system 13 can be installed in the inner portion in the vehicle width direction of the upper inner member 33. Thus, during the small overlap collision, it can be possible to prevent the displacement of the position of the front pillar 30 and to expand the airbag at an intended position.

Next, a description will be made on modified embodiments in each of which the embodiment is partially modified.

1] In the embodiment, the description has been made on the example in which the energy absorption section E can include the single outer bead section 31*b* provided in the outer member 31 and the single inner bead section 32*b* provided in the lower inner member 32. However, at least the bend section A may be subjected to the out-of-plane deformation in the longitudinal orthogonal direction of the front pillar 30, and the energy absorption section E may include only one of the outer bead section 31*b* and the inner bead section 32*b*. In addition, the plural outer bead sections 31*b* and/or the plural inner bead sections 32*b* can be provided.

2] In the embodiment, the description has been made on the example in which the energy absorption section E can include the outer bead section 31*b* and the inner bead section 32*b*. However, at least the bent section A may only be subjected to the out-of-plane deformation in the longitudinal orthogonal direction of the front pillar 30, and the energy absorption section E may be configured to include a fragile section that may be formed, for instance, by etching or thinning instead of the bead sections.

3] In the embodiment, the description has been made on the example in which the inner member of the front pillar 30 can include the lower inner member 32 and the upper inner member 33. However, the front pillar 30 may include the single inner member. Alternatively, the inner member can be divided into three or more inner members.

4] In the embodiment, the description has been made on the example in which the notched sections may be only formed in the lower inner member 32. However, the notched section may be formed in the outer member 31 in a manner to correspond to the outer bead section 31*b*.

5] In addition to the above, those skilled in the art can implement a mode, in which various modifications are added to the embodiment, or a mode, in which the embodiments are combined, without departing from the gist of the present disclosure, and the present disclosure includes such modified modes.

The invention claimed is:

1. A vehicle side body structure comprising:
   a hinge pillar that extends in an up-down direction;
   a front pillar that is coupled to an upper end portion of the hinge pillar via a bent section, that extends upward to a rear side in a vehicle body, and that is coupled to a front end portion of a roof side rail via a connected section; and
   an apron reinforcement that extends forward from a position below the bent section in the hinge pillar, wherein
   the bent section includes an energy absorption section configured to be subjected to out-of-plane deformation in a longitudinal orthogonal direction of the front pillar and thereby absorb collision energy in a case where the collision energy, which is directed rearward, is applied to the apron reinforcement,
   the front pillar includes:
      an outer member; and
      an inner member that cooperates with the outer member to form a closed cross section shifted upward to the rear,
   the energy absorption section includes a bead section in the outer member and/or the inner member,
   each of the outer member and the inner member has a flange in an outer edge portion, and the flange has a notched section at a position adjacent to the bead section.

2. The vehicle side body structure according to claim 1, wherein
in each of the outer member and the inner member, the flange is joined by plural joint sections, and
a distance between a first set of one or more joint sections that are adjacent to the bead section is longer than a distance between a second set of one or more joint sections that are away from the bead section.

3. The vehicle side body structure according to claim 2, wherein
the energy absorption section has an outer bead section provided in the outer member and an inner bead section provided in the inner member, and
the outer bead section and the inner bead section are located at substantially a same position in a front-rear direction in a side view of the vehicle side body structure.

4. The vehicle side body structure according to claim 3, wherein
the outer bead section projects from the closed cross section, and the inner bead section is recessed relative to the closed cross section.

5. The vehicle side body structure according to claim 4 further comprising:
a curtain airbag system that includes an airbag in the form of a curtain, the airbag being inflatable and expandable by gas pressure supplied under a condition where a specified condition is established, wherein
the curtain airbag system is installed in an inner portion in a vehicle width direction of the inner member of the front pillar.

6. The vehicle side body structure according to claim 1, wherein
the energy absorption section has an outer bead section provided in the outer member and an inner bead section provided in the inner member, and
the outer bead section and the inner bead section are located at substantially a same position in a front-rear direction in a side view of the vehicle side body structure.

7. The vehicle side body structure according to claim 1 further comprising:
a curtain airbag system that includes an airbag in the form of a curtain, the airbag being inflatable and expandable by gas pressure supplied under a condition where a specified condition is established, wherein
the curtain airbag system is installed in an inner portion in a vehicle width direction of the inner member of the front pillar.

8. The vehicle side body structure according to claim 1, wherein
the energy absorption section has an outer bead section provided in the outer member and an inner bead section provided in the inner member, and
the outer bead section and the inner bead section are located at substantially a same position in a front-rear direction in a side view of the vehicle side body structure.

9. The vehicle side body structure according to claim 1 further comprising:
a curtain airbag system that includes an airbag in the form of a curtain, the airbag being inflatable and expandable by gas pressure supplied under a condition where a specified condition is established, wherein
the curtain airbag system is installed in an inner portion in a vehicle width direction of the inner member of the front pillar.

10. The vehicle side body structure according to claim 6, wherein
the outer bead section projects from the closed cross section, and the inner bead section is recessed relative to the closed cross section.

11. The vehicle side body structure according to claim 6 further comprising:
a curtain airbag system that includes an airbag in the form of a curtain, the airbag being inflatable and expandable by gas pressure supplied under a condition where a specified condition is established, wherein
the curtain airbag system is installed in an inner portion in a vehicle width direction of the inner member of the front pillar.

12. The vehicle side body structure according to claim 8, wherein
the outer bead section projects from the closed cross section, and the inner bead section is recessed relative to the closed cross section.

13. The vehicle side body structure according to claim 8 further comprising:
a curtain airbag system that includes an airbag in the form of a curtain, the airbag being inflatable and expandable by gas pressure supplied under a condition where a specified condition is established, wherein
the curtain airbag system is installed in an inner portion in a vehicle width direction of the inner member of the front pillar.

14. The vehicle side body structure according to claim 2 further comprising:
a curtain airbag system that includes an airbag in the form of a curtain, the airbag being inflatable and expandable by gas pressure supplied under a condition where a specified condition is established, wherein
the curtain airbag system is installed in an inner portion in a vehicle width direction of the inner member of the front pillar.

15. The vehicle side body structure according to claim 10 further comprising:
a curtain airbag system that includes an airbag in the form of a curtain, the airbag being inflatable and expandable by gas pressure supplied under a condition where a specified condition is established, wherein
the curtain airbag system is installed in an inner portion in a vehicle width direction of the inner member of the front pillar.

* * * * *